United States Patent
Owen et al.

(10) Patent No.: US 7,028,605 B2
(45) Date of Patent: Apr. 18, 2006

(54) AUDIBLE SIGNAL VALVE KNOB WITH TIMER

(75) Inventors: Edward S. Owen, West Bend, WI (US); Jeffrey S. Rohrer, Kewaskum, WI (US); Allen C. Eimerman, Fond du Lac, WI (US)

(73) Assignee: Regal Ware, Inc., Kewaskum, WI (US)

( * ) Notice: Subject to any disclaimer, the term of this patent is extended or adjusted under 35 U.S.C. 154(b) by 407 days.

(21) Appl. No.: 10/445,712

(22) Filed: May 27, 2003

(65) Prior Publication Data

US 2004/0238044 A1    Dec. 2, 2004

(51) Int. Cl.
*A47J 27/09* (2006.01)
*F16K 37/00* (2006.01)

(52) U.S. Cl. .................. 99/344; 137/552; 137/552.7; 368/10

(58) Field of Classification Search ............... 137/552, 137/552.7, 554, 556, 556.3; 99/342, 344; 368/10
See application file for complete search history.

(56) References Cited

U.S. PATENT DOCUMENTS

| | | | |
|---|---|---|---|
| 468,334 A * | 2/1892 | Ferrell | 137/553 |
| 2,192,600 A | 3/1940 | Lurtz | |
| 2,488,754 A * | 11/1949 | Willson | 137/552.7 |
| 3,416,566 A * | 12/1968 | Anderson | 137/554 |
| 4,134,358 A | 1/1979 | Heermans | |
| 4,193,166 A | 3/1980 | Neff | |
| 4,313,371 A | 2/1982 | Jackson et al. | |
| 4,418,637 A | 12/1983 | Heermans | |
| 4,451,156 A | 5/1984 | Kloppsteck | |
| 4,548,156 A | 10/1985 | Shibata | |
| 4,571,580 A | 2/1986 | Winteler et al. | |
| 4,690,095 A | 9/1987 | Walls et al. | |
| 4,776,296 A | 10/1988 | Heermans | |
| 4,856,564 A | 8/1989 | Obal | |
| 4,857,897 A | 8/1989 | Chen | |
| 4,862,552 A | 9/1989 | Remmel | |
| 4,953,452 A | 9/1990 | Tarlow | |
| 4,991,755 A * | 2/1991 | Grusmark | 368/10 |
| 5,003,960 A | 4/1991 | Hanagan | |
| 5,088,069 A | 2/1992 | Koziol | |
| 5,341,728 A * | 8/1994 | Ejiri et al. | 99/344 |
| 5,390,440 A * | 2/1995 | Mihealsick | 43/124 |
| 5,471,912 A | 12/1995 | Lin | |
| 5,644,552 A * | 7/1997 | Lien | 368/10 |
| 5,771,783 A | 6/1998 | Uss | |
| 6,004,000 A | 12/1999 | Hupf et al. | |
| 6,105,810 A | 8/2000 | Daenen et al. | |
| 6,202,875 B1 | 3/2001 | Chang | |
| 6,273,285 B1 | 8/2001 | Chang | |
| 6,323,777 B1 | 11/2001 | Durston et al. | |

* cited by examiner

*Primary Examiner*—John Rivell
(74) *Attorney, Agent, or Firm*—Ryan Kromholz & Manion, S.C.

(57) ABSTRACT

A signal generating valve and timer assembly includes a valve slide and a controller. The controller is coupled to the valve and is adapted to engage the valve to move the valve from a first position to a second position. The valve generates a first signal in at least one of the first or second positions. Movement of the valve slide from the first position to the second position engages an actuator device to activate a switch on the timer to start the timer running for a pre-programmed time period. The timer generates a second signal at the expiration of the selected time period.

10 Claims, 6 Drawing Sheets

AUDIBLE SIGNAL VALVE KNOB WITH TIMER

FIELD OF THE INVENTION

The invention relates to an audible signal valve and timer for a cooking vessel.

BACKGROUND OF THE INVENTION

The present invention relates generally to the field of cooking and more specifically to the use of accessory or integral devices that can be used to indicate the general temperature of the cooking vessel (or its contents) and to time the cooking process. Further, the present invention is believed to have particular application in the field of "Waterless" cooking especially in conjunction with devices that provide an audible signal.

"Waterless" cooking is old, as are knobs that give an audible signal when steam is formed to indicate attainment of cooking temperatures. Knobs for cooking vessels that are provided with whistles and having mechanisms to turn the whistle off or to allow the escape of steam are also known. Such whistle knobs are disclosed in U.S. Pat. Nos. 4,134,358, 4,418,637, 4,776,296, 4,862,552, and 6,004,000, all of which are incorporated herein by reference. Additionally, cooking timers are known.

In conventional systems, the audible signal device alerts the cook when the temperature is high enough to start cooking. The cook then turns off the device, typically by manually pushing on a valve to slide the valve from an open to a closed position. The cook then starts a timer to time the cooking process.

Accordingly, it is a goal of the present invention to provide a structure for easily and controllably moving a slide valve between an open and a closed position.

It is a further goal of the present invention to provide a structure and method in which movement of the slide valve from an open to a closed position also simultaneously activates the timer to begin timing the cooking sequence.

It is another goal of the present invention to provide an integrated valve and timer assembly.

SUMMARY OF THE INVENTION

One aspect of the invention provides a valve assembly. The assembly comprises a slide valve. The slide valve has a first position and a second position and generates a signal in at least one of the first and second positions. A rotatable controller is adapted to engage the valve to move the valve from the first to the second position.

Another aspect of the invention provides a signal generating valve and timer assembly. A slide valve has a first position and a second position and generates a first signal in at least one of the first or second positions. A controller is adapted to engage the valve to move the valve from the first position to the second position. The timer is selectively programmable to run for a selected time period and generates a second signal at the expiration of the selected time period. A timer also has an activation switch that starts the running of the timer. The timer is coupled to the slide valve and movement of the slide valve from the first position to the second position engages an actuator device that activates the switch to start the timer running for a pre-programmed time period.

According to another aspect of the invention, the timer is removably coupled to the slide valve. According to another aspect of the invention, at least one of the first and second signals is an audible signal, such as a whistle or a buzzer.

According to another aspect of the invention, the valve and timer assembly is removably coupled to a cooking vessel.

Another aspect of the invention provides a method for using a valve and timer assembly. The assembly includes a slide valve having a first position and a second position. The slide valve generates a first signal in at least one of the first or second positions. A controller is adapted to engage the valve to move the valve from the first position to the second position. The timer is selectively programmable to run for a selected time period and generates a second signal at the expiration of the selected time period. A timer has an activation switch that starts the running of the timer. The timer is coupled to the slide valve and movement of the slide valve from the first position to the second position engages an actuator device that activates the switch to start the timer running for a pre-programmed time period.

The method provides for coupling the assembly on a cooking vessel, setting the timer for the selected time period, placing the valve in the first position, heating the cooking vessel to a pre-determined temperature whereby the first signal is generated, and moving the valve from the first position to the second position, thereby stopping the first signal and actuating the activation switch to starting the running of the timer.

DESCRIPTION OF THE PREFERRED EMBODIMENT

Although the disclosure hereof is detailed and exact to enable those skilled in the art to practice the invention, the physical embodiments herein disclosed merely exemplify the invention that may be embodied in other specific structure. While the preferred embodiment has been described, the details may be changed without departing from the invention, which is defined by the claims.

Figure 1:
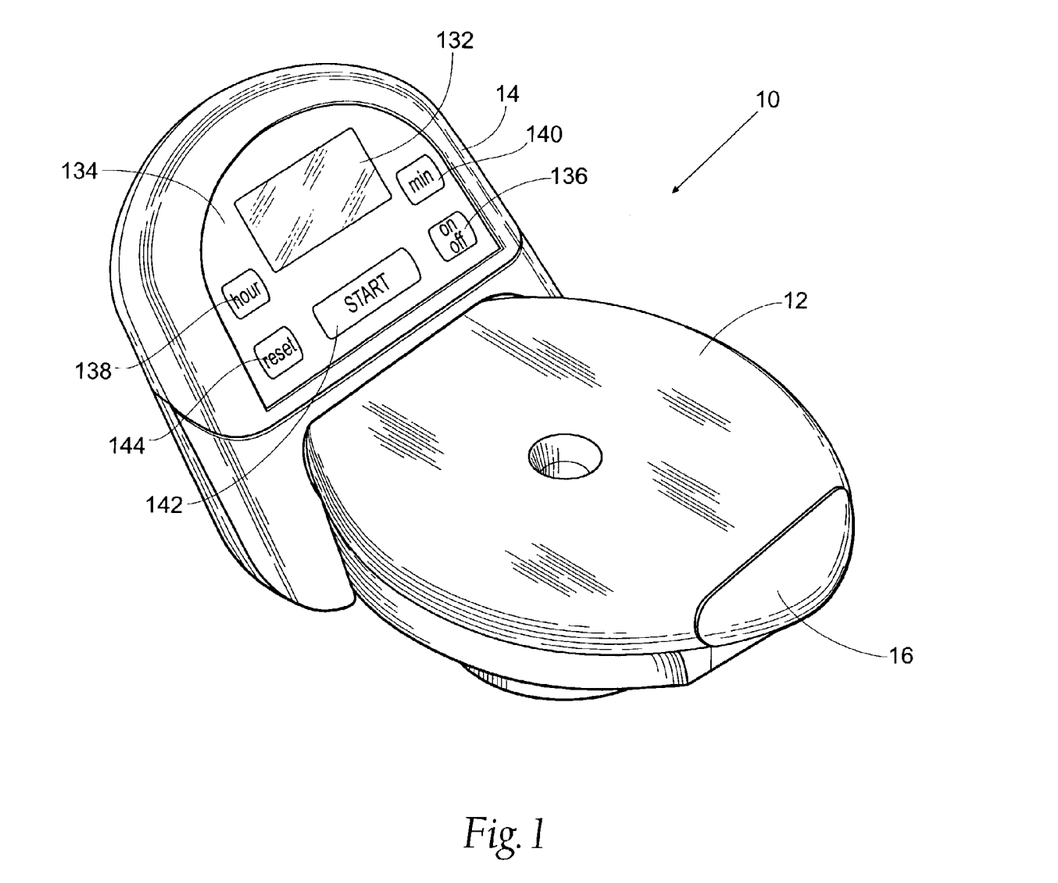
FIG. 1 is a perspective view of the valve and timer assembly.

FIG. 1 shows an audible signal valve and timer assembly 10 for attachment to a cooking vessel. The assembly 10 comprises an audible signal valve knob assembly 12 coupled with a timer 14 and adapted to give an audible signal when steam is formed to indicate attainment of cooking temperatures. Upon alert by the audible signal, the valve may be manually closed by manipulation of a controller 16 to stop the audible signal. Manipulation of the controller 16 to close the valve simultaneously also initiates activation of the timer 14, which may be preset for a desired time period. At the end of the preset or programmed time period, the timer 14 gives an audible signal to indicate expiration of the time period and thereby alert the cook.

The Valve Assembly

In the illustrated embodiment, the valve assembly 12 is of a slightly elongated or elliptical configuration. It is apparent that a variety of other configurations may also provide suitable function, e.g., circular or square.

Figure 2:
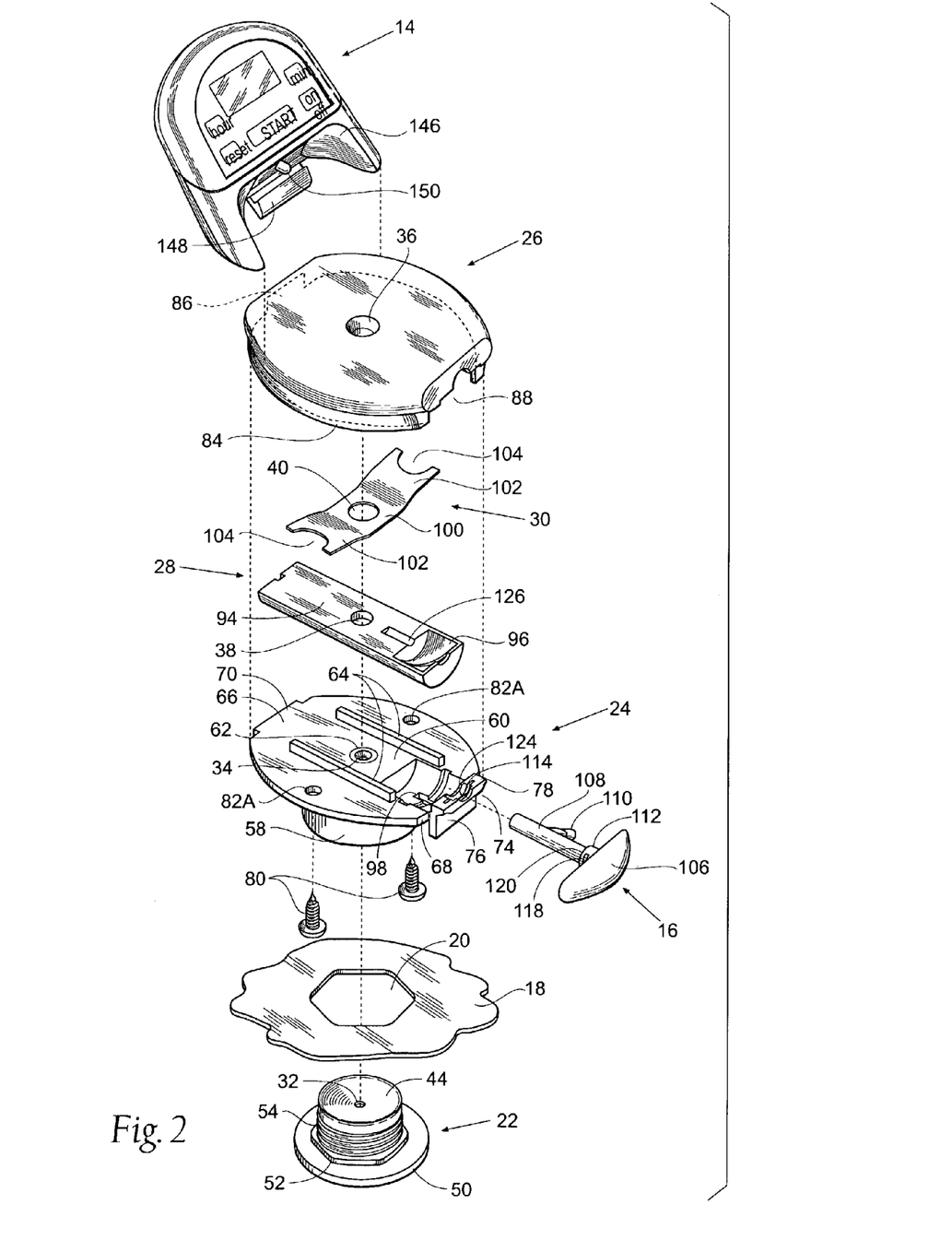
FIG. 2 is an exploded view of the assembly shown in FIG. 1.

As FIG. 2 illustrates, the top of a cooking vessel 18 is provided with a non-circular opening 20 to which the various parts of the valve assembly 12 are mounted. These consist of an inner knob or knob base 22, an outer or upper knob 24, a knob cover 26, a valve slide 28, and leaf spring 30.

Figure 5:
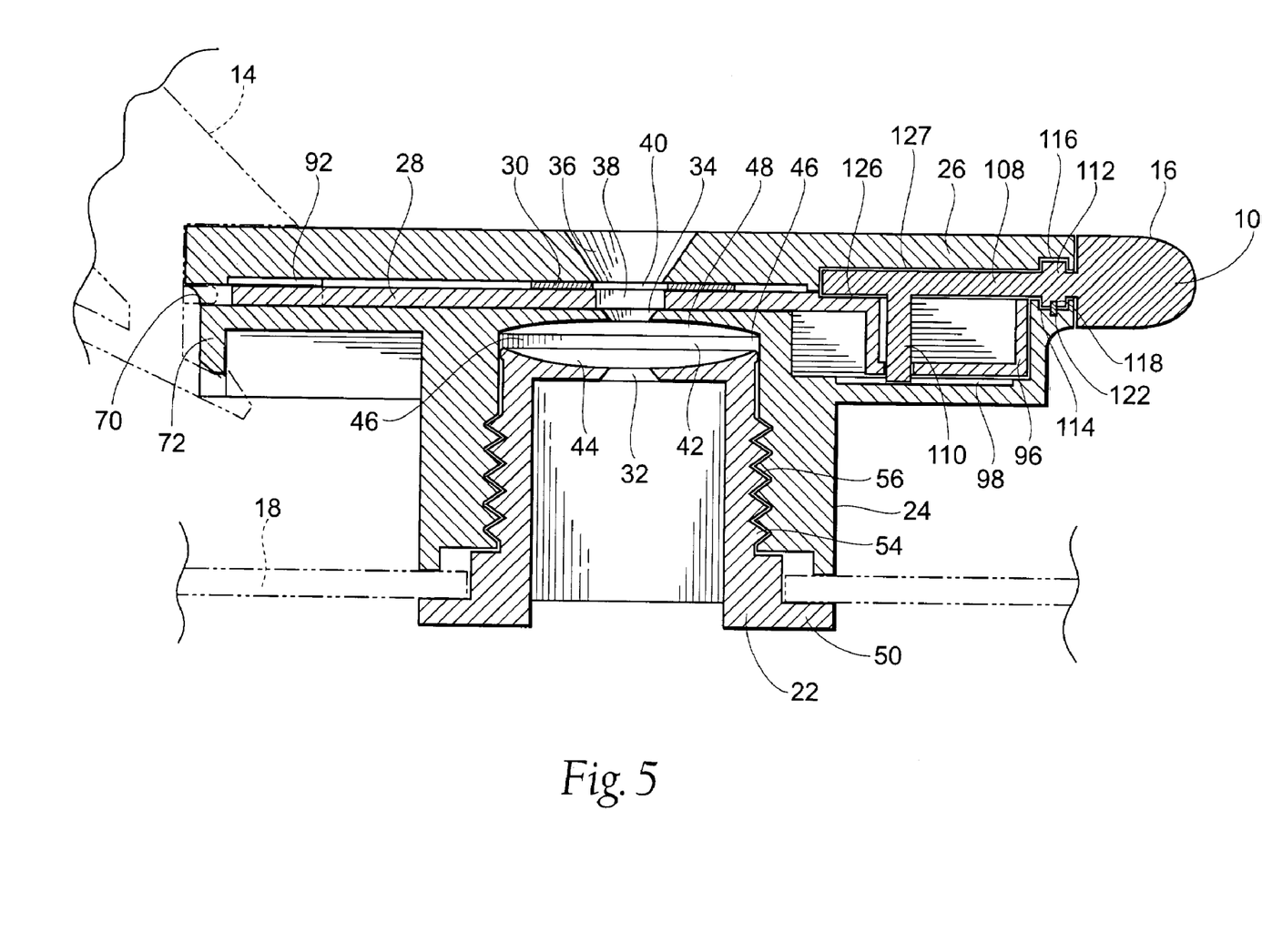
FIG. 5 is a sectional view of the valve and timer assembly taken along line 5—5 in FIG. 3.
Figure 6:
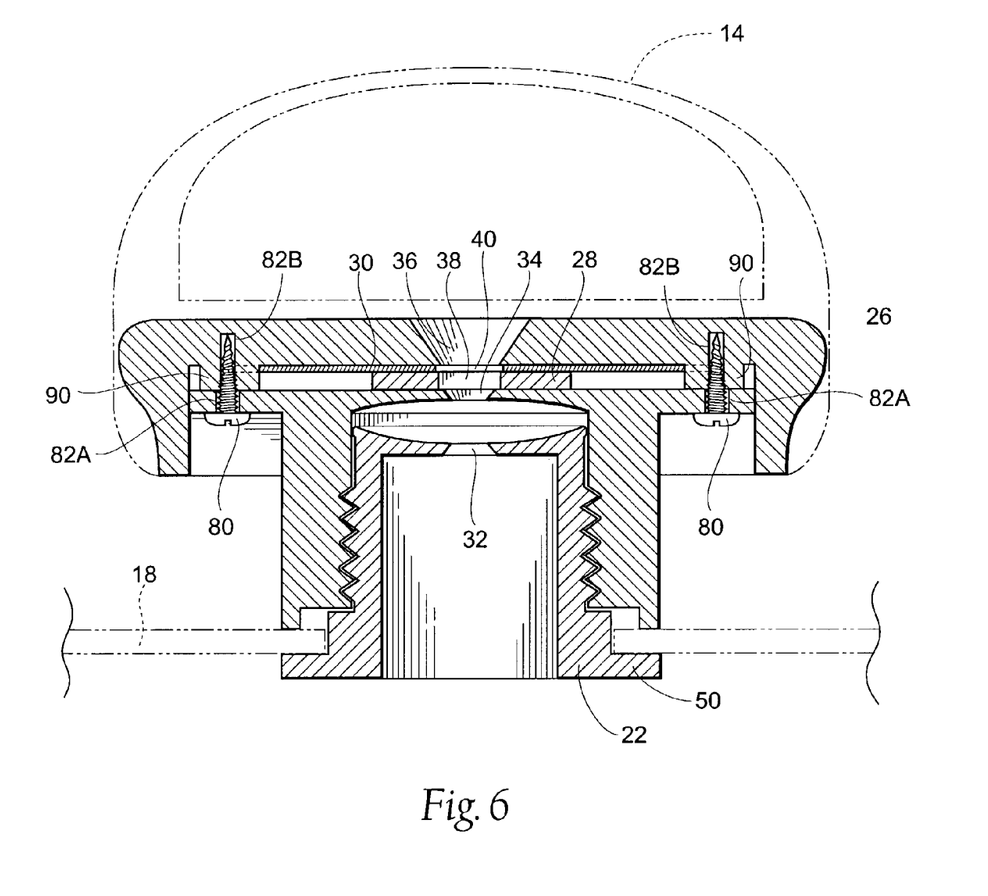
FIG. 6 is a sectional view of the valve and timer assembly taken along line 6—6 in FIG. 4.

As best seen in FIGS. 5 and 6, the valve assembly 12 presents a series of orifices 32, 34, 36, 38, and 40 separated by a resonance chamber 42 consisting of a lower surface 44 in the knob base 22, sidewall 46 and an upper surface 48 in the upper knob 24, which form a very effective whistle.

The base or inner knob 22 is desirably formed of a somewhat resilient plastic and consists of a lower flange 50, a hexagonal portion 52 to complementarily fit the opening 20 in the vessel 18, which could be any appropriate preferably non-circular shape, a threaded portion 54 and the lower resonance chamber portion 44 surrounding whistle orifice 32 having a form suited to generate a tone when vapor passes through it.

Upper knob 24 is desirably formed of a somewhat resilient plastic and consists of an inner skirt 56 adapted to screw on to threaded portion 54 of the lower knob 22, an outer skirt 58 which bears on the vessel 18 when upper knob portion 24 is screwed into place, a horizontal valve supporting surface 60, a resonance chamber sidewall 46 and a resonance chamber top 48, the center of the top 48 of the resonance chamber being provided with a whistle orifice 34 directly above the first orifice 32 in the assembled position, an orifice-surrounding boss 62, and guide bars 64 (abutments). It should be noted that the height of boss 62 above surface 60 is exaggerated here for clarity.

One end of the valve assembly 12 engages the timer 14 and therefore will be referred to as the timer end 66. The opposing end of the valve assembly 12 receives the slide controller 16 and therefore will be referred to as the controller end 68. The upper knob 24 is provided with a slight projection 70 extending from the timer end 66 and having a depending tab 72 that underlies the slide valve path.

The upper knob 24 also includes a slight projection 74 extending from the controller end 68 and having a depending tab portion 76 and a flange portion 78. The tabs 72 tab 76 become part of the knob cover 26, which aligns it for non-rotatable assembly with outer knob 24 by means of fasteners, e.g., screws 80 that are received through openings 82A in outer knob 24 and openings 82B in knob cover 26.

The knob cover 26 is desirably formed of a somewhat resilient plastic and is provided with a depending skirt 84 extending entirely around the knob cover 26 and enclosing it with the exception of relieved portions 86 and 88 at the timer and controller ends 66 and 68 respectively. Depending tabs 72 and 76 of the upper knob 24 are sized and configured so that when the knob cover 26 is placed onto the upper knob body 24 it is automatically aligned to receive screws 80 which secure the upper knob body 24 to the knob cover 26 through openings 82A and 82B. That is, openings 86 and 88 in skirt 84 form keys to receive projections 70 and 74 respectively for non-rotatable alignment. Projection 70 also serves in its upper portion as part of the valve slide path, as will be described in greater detail later.

In a preferred embodiment, openings 82B in knob cover 26 take the form of bores within a pair of studs 90 depending from the under side of its upper wall 92 within the margin of skirt 84 to receive screws 80 and to assist in locating leaf spring 30.

Knob cover 26 is also provided with an orifice 36 at the center of the upper surface 92 and is aligned with orifices 32 and 34 when the knob 12 is assembled.

Valve slide 28 rests on boss 62 and is movable along a valve slide path extending from projection 74 to the diametrically opposite surface extension 70 between guides 64. Valve slide 28 consists of a flat rectangular body 94 and a recessed cam surface 96. Recessed cam surface 96 is sized and configured to be received in a complementary cam recess 98 adjacent projection 74 in valve supporting surface 60 of upper knob 24. Valve slide body 94 includes whistle orifice 38. Valve slide 28 is slidable along the axis of cam recess 98 to permit whistle orifice 38 to be moved in the direction of the valve slide path to a first position aligned with orifices 32, 34, and 36 to a second position completely unaligned with orifices 32, 34, and 36 in the assembled position.

Leaf spring 30 is a generally rectangular member made of any suitably resilient and heat resistant material such as spring stainless steel. It has a depressed central portion 100, a raised wing 102 at each end, forked ends 104 in each wing to locate spring 30 between the studs 90 depending from knob cover 26, and a central orifice 40 positioned coaxially of orifices 32, 34, and 36 when the knob 12 is assembled. The leaf spring 30 biases valve slide means 28 away from upper wall 92 into engagement with boss 62 so the valve slide 28 is always biased into good contact with the boss 62 and provides an effective seal, whether the valve is opened or closed. Changing the dimensions or material of leaf spring 30 can vary the exact amount of bias, e.g., by changes in the angle of the wings 102 or their width, length or thickness. The bias should be sufficient to create a seal and maintain the selected position of slide 28, but not so great as to distort the valve slide 28 or prevent the slide 28 from being operated to open or close the valve.

Thus, in the present embodiment, valve means are defined by valve supporting surface 60, whistle orifice 34, boss 62, valve slide means 28 thereof, and leaf spring 30 bearing between upper wall 92 and valve slide means 28. These parts cooperate together to regulate the flow of a fluid such as air between whistle orifice 34 and the exterior of the valve assembly 12 according to the position of valve slide means 28 in the previously defined valve slide path.

Figure 3:
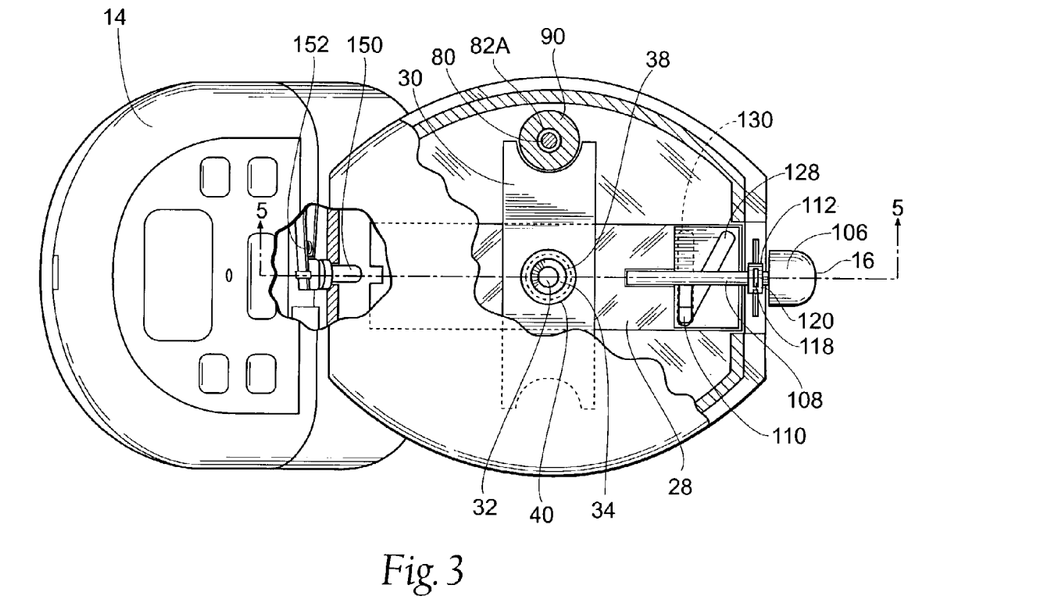
FIG. 3 is a top partial sectional view of the valve and timer assembly illustrating the valve in the open position.
Figure 4:
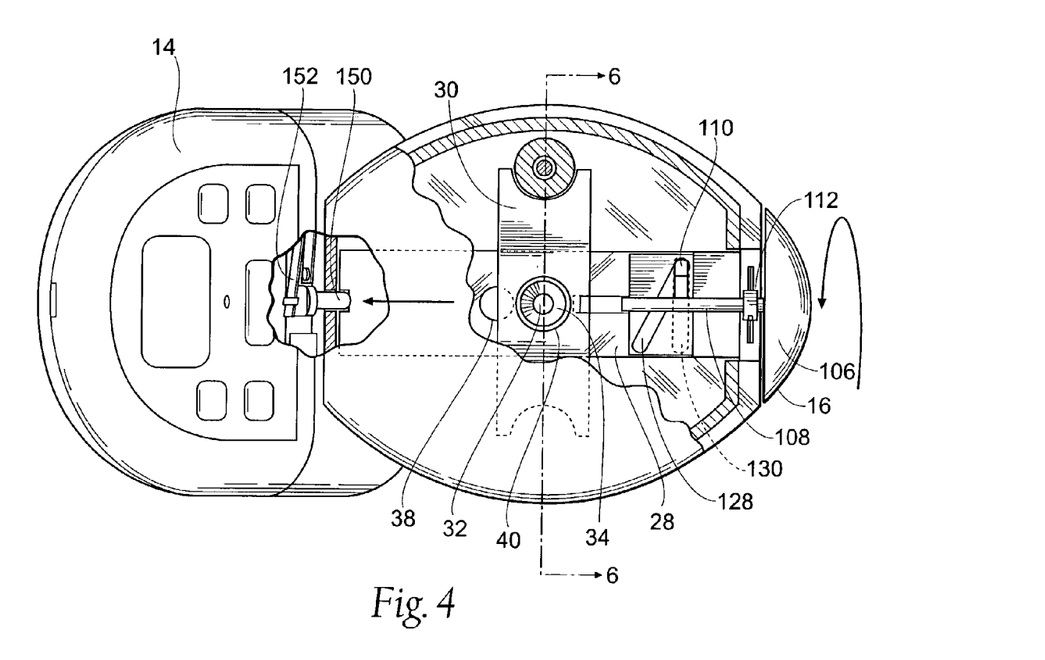
FIG. 4 is a top partial sectional view of the valve and timer assembly illustrating the valve in the closed position.

A manual controller 16 is provided and serves as an actuator for sliding the valve slide 28 from an open position in which valve slide orifice 38 is aligned with knob orifices 32, 34, 36 and 40 (FIG. 3) to a closed position in which valve slide orifice 38 is not aligned with knob orifices 32, 34, 36 and 40 (FIG. 4).

Controller 16 comprises a knob 106, a stem 108 extending from the knob 106, and a cam follower 110 depending from the stem 108. An annular ring 112 is desirably located on the stem 108 adjacent the knob 106 and is received in a recess 114 in flange 78 of projection 74 and notch 116 of knob cover 26. In the illustrated embodiment, ring 112 provides a pair of grooves 118 at right angles on the side 120 and the underside 122 of ring 112 and recess 114 includes a lip 124 adapted to receive grooves 118. Lip 122 is desirably a small wire spring, e.g., stainless steel or other suitable metal, that provides a constant and smooth turning feel as the controller 16 is rotated. This arrangement assures that the annular ring 112 is properly oriented within the recess 114 and also permits controlled rotation of the annular ring 112, and thus the controller 16, within the recess 114.

In the illustrated and preferred embodiment, stem 108 of controller 16 is received in a notch 126 in valve body 94 and notch 127 in knob cover 26. Cam follower 110 rests within a slot 128 in cam surface 96 and a notch 130 in cam recess 98. The arrangement of ring 112 within recess 114 (and groove 118 aligned with lip 122), stem 108 within notches 126 and 127, and cam follower 110 within slot 128 and notch 130 allows only one way for the controller 16 to be positioned and that way is clear to the user.

FIG. 3 illustrates the valve slide 28 in an open position. As FIG. 4 shows, as knob 106 is rotated in a first direction (indicated by arrow), cam follower 110 advances from one end of slot 128 to the opposing end and from one end of notch 130 to the opposing end. As FIG. 4 also shows, as cam follower 110 advances, cam surface 96 is advanced along cam recess 98, thereby moving valve slide 28 along the slide path to the closed position. Rotation of the knob 106 in the reverse direction similarly moves the valve slide back to the open position.

The Timer

It is apparent that a variety of conventional timer mechanisms can be suitable for use with the knob assembly 12. In a representative embodiment, presented by way of illustration and not limitation, the timer 14 is battery-operated. With reference again to FIG. 1, the timer 14 includes an LED display 132 to indicate time and a touch screen 134 provides a series of control buttons that make the timer 14 easily programmable.

An ON/OFF button 136 controls power to the timer 14. HOUR 138 and MIN. 140 select buttons allow a desired time to be programmed. A START 142 button activates the timer 14 to start running of timer 14 to count down the pre-programmed time period. A RESET 144 button allows the timer 14 to put the running time sequence on hold, e.g., by pressing the RESET button 144 for one second. Pressing START 142 again resumes the timing sequence. The RESET button 144 can also function to clear the programmed time sequence from the timer 14, e.g., pressing for two seconds or longer resets the timer 14 to 00:00. The RESET button 144 also functions to stop the alarm after the countdown has reached 00:00.

When the programmed time period has expired, i.e., when the running sequence has counted down to 00:00, the alarm sounds, e.g., for one minute, and the display will read 00:00 until the ON/OFF button 136 is depressed.

The timer 14 is sized and configured to couple with the valve assembly 12. For example, in the illustrated embodiment, the timer 14 includes a curved pocket area 146 that rests on the timer end 66 of the valve assembly 12. It is contemplated that other configurations can also suitably couple the timer 14 with the valve assembly 12.

Figure 7:
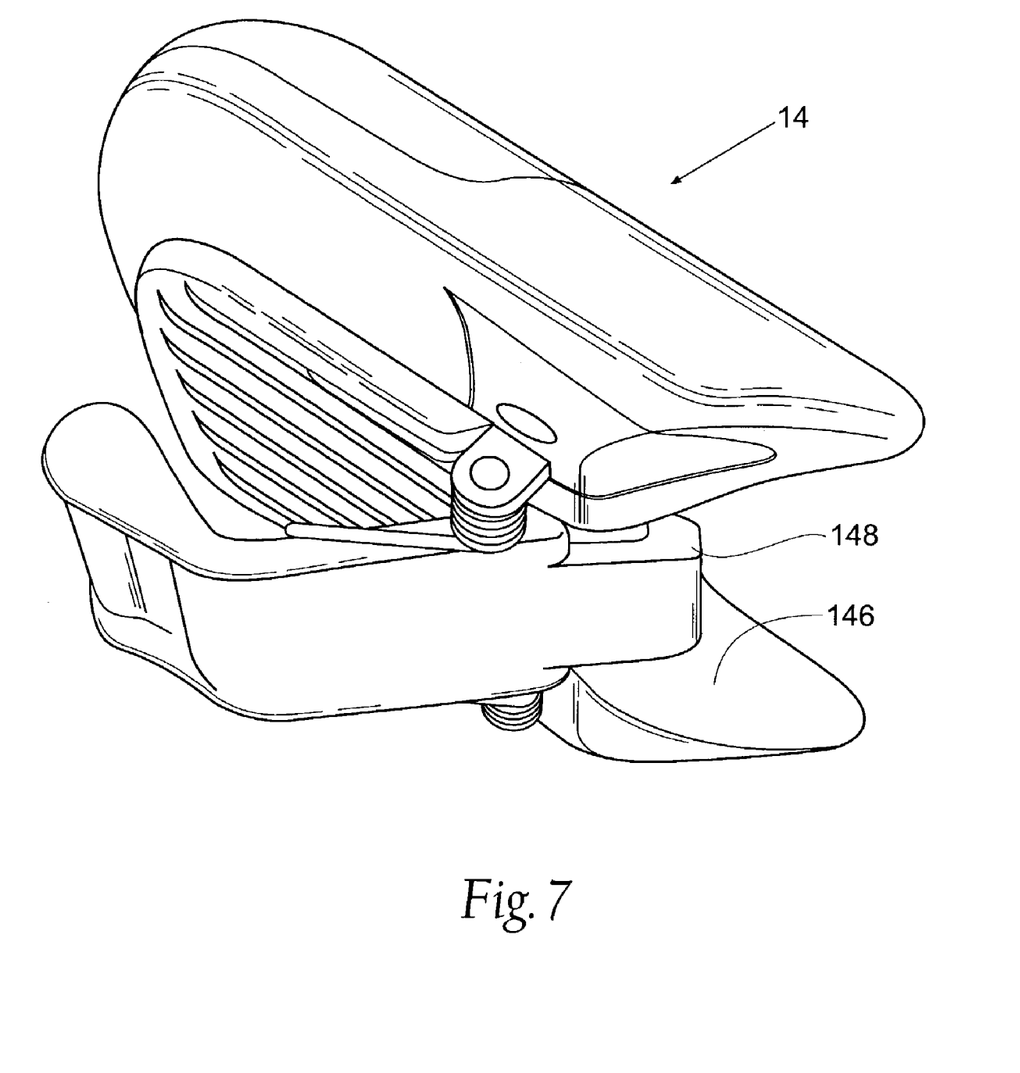
FIG. 7 is a back perspective view of the timer.

The timer 14 is desirably selectively removable from the valve assembly 12, permitting the timer 14 to be used independently of valve assembly 12. FIG. 7 illustrates a preferred embodiment in which a spring-loaded clip 148 acts as a base for standing the timer 14 on a surface, e.g., countertop.

The timer 14 is activated by controller 16 by advancement of valve slide 28 from the open position (see FIG. 3) to the closed position (see FIG. 4), which depresses an activation pin 150 which acts as an actuator to engage a switch 152, e.g., a single throw, single pole contact switch, to thereby start the running of the pre-programmed time period. In the illustrated embodiment, the switch 152 is biased in a normally closed position. Advancement of the valve slide 28 from the open to the closed position places pressure on pin 150 to break contact and thereby activate the switch 152.

In an alternative embodiment, the switch 152 is biased in a normally open position (not shown). In this arrangement, advancement of the valve slide 28 from the open to the closed position releases pressure on pin 150 to close the switch 152 and establish contact to thereby activate the switch 152.

Alternatively, the timer 14 can be activated by pressing the START button 142. Thus, the timer 14 can be activated either by pressing the START button 142 or by closing the valve slide 28. This arrangement provides a multi-functional and versatile timer 14, allowing the timer 14 to be used without the use of either the valve slide 28 or a cooking vessel 18. To use the timer 14 independent of the knob assembly 12, one simply presses the START button 142.

The timer 14 can be configured to be programmed in a variety of ways. In a representative embodiment, power to the timer 14 is controlled by pressing the ON/OFF button 136. A desired running time is set by pressing the HOUR and MIN buttons 138 and 140. Pressing the HOUR button 138 once will advance the hours one at a time. Similarly, pressing the MIN button 140 once will advance the minutes one at a time. Pressing the HOUR or MIN buttons 138 or 140 for more than two seconds will fast forward the hour and minutes respectively.

Pressing the START button 142 activates the timer 14 to start the timer 14 running for the programmed time period. Desirably, the timer 14 indicates that activation has occurred, e.g., by flashing COLON symbol (:). Upon activation, the timer 14 counts down to 0:00 and an audible signal alarm, e.g., a buzzer, will sound. It is contemplated, however, that a visual signal (e.g., flashing 0:00) can be given in place of or in addition to an audible signal.

The timer 14 can be programmed so that the alarm sounds for a certain time period, e.g., 1 min. If the alarm is not turned off, the timer 14 will sound an audible alarm every five mins. for 15 secs. and the display 132 will continue to read 0:00. The alarm can be stopped by pressing the RESET button 144 or the ON/OFF button 136.

System Use

When food is being heated in vessel 18, a temperature is reached at which substantial quantities of water vapor are generated and rush through orifices 32 and 34 and the intervening resonance chamber 42, creating a whistling sound to warn the cook that the temperature should now be reduced for effective waterless cooking. The valve slide 28 is then moved from the open position shown in FIG. 3 to the closed position shown in FIG. 4 in which opening 38 is displaced with respect to orifices 32, 34, 36, and 40 by manipulating controller 16. The top of vessel 18 in which the assembly 12 is located is now completely sealed and will retain the vapor within the pan to seal in the flavors and moisture. Such cooking is well known.

However, the presence of the whistle orifices 32, 34, 36, 38, and 40 and resonance chamber 42 in the valve assembly 12 offer the possibility of contamination by volatile food substances, or even, if the conditions are wrong, by solids passing through orifice 32. In any case, it is desirable to be able to attain complete cleanliness in the assembly 12.

As best shown in FIG. 2, by removing the entire upper knob body 24, slide 28, and knob cover 26 by unscrewing them from lower knob body 22, the assembly 12 may be removed from vessel 18. It will be noted that although pressure can be applied only to knob cover 26, the reliefs 86 and 88 serve to prevent relative rotation, as do screws 80, and apply the pressure to projections 70 and 74 of the upper knob 24 body, carrying it along as the cover 26 is rotated. Because opening 20 is preferably non-circular; and complementary non-circular portion 52 of the lower knob 22 body fits within it. Therefore, the upper portion (outer knob 24, valve slide 28, controller 16, and knob cover 26) moves as a unit and it is easy to turn the upper portion while the lower portion (cooking vessel 18 and knob base 22) remains stationary. The only remaining step to completely disassemble the valve assembly 12, if that is necessary, is to remove the two screws 80. These have been exposed once the outer parts of the assembly 12 are removed, but are concealed by insulative plastic when the knob valve assembly 12 is assembled.

From a consideration of FIGS. 2 and 5, and as previously noted, there is only a single way in which the valve slide 28 and controller 16 may be positioned within the knob assembly 12. The slide 28 is placed on upper body 24 between guides 64. The controller 16 can be positioned by aligning ring 112 within recess 114 (and groove 118 with lip 122), stem 108 within notch 126, and cam follower 110 within slot 128 and notch 130. Alternatively, controller 16 can be positioned within knob cover 26 by placing stem 108 in notch 127 and ring 112 in notch 116. Leaf spring 30 is placed within the cover 26 between studs 90. The cover 26 is placed over upper knob 24, as guided by tabs 72 and 76 and reliefs 86 and 88. Screws 80 are then inserted and fastened to secure upper knob 24 and cover 26. The knob base 22 may then be inserted in vessel 18 through opening 20 and the outer knob 24/knob cover 26 assembly screwed on to threads 54, whereupon skirt 58 bears on vessel 18 above flange 50 to give a very secure anchorage. The timer 14 is then coupled to the knob assembly 12.

The cook then sets the timer 14 for a desired time period and places the valve slide 28 in the open position. The vessel 18 is then heated to a desired temperature, resulting in the generation of a whistle or other audible signal from the valve assembly 12. In response to the audible signal, the cook closes the slide valve 28 by manipulating the controller 16. Closing of the slide valve 28 activates the timer 14 to start the running of the pre-selected time period. Upon expiration of the desired time period, the timer 14 generates an audible signal to again alert the cook.

It will be seen from FIG. 1 that when the parts are disassembled all surfaces are readily accessible for cleaning, whether the disassembly is complete or whether the upper separable parts are merely unscrewed from the base part. In either case there is only one way to re-assemble the parts and that way is clear to the user, as previously noted.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

We claim:

1. An audible signal generating valve assembly and a cooperating, independently operable, timer assembly for a cooking vessel, comprising, in combination:
    means located in said valve assembly for initiating and maintaining an audible signal at a preselected temperature of the contents of said cooking vessel;
    a slide valve having a first position and a second position and generating a first audible signal in at least one of the first or second positions;
    a controller adapted to engage the slide valve to move the slide valve from the first position to the second position and thereby interrupt the first audible signal;
    said timer assembly including means for removably coupling said timer assembly to said valve assembly, and further including a switch and an actuator device for activating the switch and being coupled to the slide valve, the timer selectively programmable to run for a selected time period and generating a second signal at the expiration of the selected time period, the activation of the switch starting the timer running for the selected time period; and
    wherein movement of the slide valve from the first position to the second position engages the actuator device to activate the switch.

2. An assembly as in claim 1 wherein the first audible signal is a whistle.

3. An assembly as in claim 1 wherein the second signal is a buzzer.

4. The valve assembly of claim 1 including at least one orifice arranged for passage of water vapor escaping from said heated contents of said cooking vessel and including means for closing said orifice and for engaging the timer actuator device to simultaneously activate the switch on movement of said slide valve from the first position to the second position.

5. The valve assembly of claim 1 wherein the valve assembly includes:
    a supporting base removably secured to said cooking vessel, and wherein said supporting base includes;
    a valve slide path with a valve slide supporting surface;
    a pair of longitudinally extending slide supporting abutments;
    a complimentary cam recess located at the first position of said valve slide;
    biasing means for biasing said valve slide toward said slide valve supporting surface; and
    a manually operable controller including a laterally extending stem portion arranged for operative attachment to said valve slide, and said stem portion further including a cam follower projecting laterally from said stem portion and arranged to slidably engage said camming groove located in the surface of said cam recess and arranged to guide said cam follower in a selected rotational and forward direction for alternative movement of said slide valve towards and away from said first position.

6. The valve assembly of claim 1 wherein said controller comprises a manually rotatable controller engageable with a cam follower, and wherein said cam follower is engageable with a cammed recess configured to convert rotatable motion to lateral motion and engage the slide valve to move the valve from the first to the second position.

7. The valve assembly of claim 1 wherein the second signal is a visual signal.

8. A method for using an assembly comprising:
    a slide valve having a first position and a second position and generating a first signal in at least one of the first or second positions,
    a controller adapted to engage the valve to move the valve from the first position to the second position, and
    a timer having a switch and an actuator device for activating the switch and being coupled to the slide valve, the timer selectively programmable to run for a selected time period and generating a second signal at the expiration of the selected time period, the activation of the switch starting the timer running for the selected time period, wherein movement of the slide valve from the first position to the second position engages the actuator device to activate the switch, the method comprising:
a. coupling the assembly on a cooking vessel
b. setting the timer for the selected time period
c. placing the valve in the first position
d. heating the cooking vessel to a pre-determined temperature whereby the first signal is generated, and
e. moving the valve from the first position to the second position, thereby stopping the first signal and simultaneously starting the timer running.

9. A method as in claim 8
wherein at least one of the first and second signals is an audible signal.

10. A method as in claim 9
wherein the audible signal is a whistle.

\* \* \* \* \*